Fig. 3.
Fig. 6.
Fig. 7.
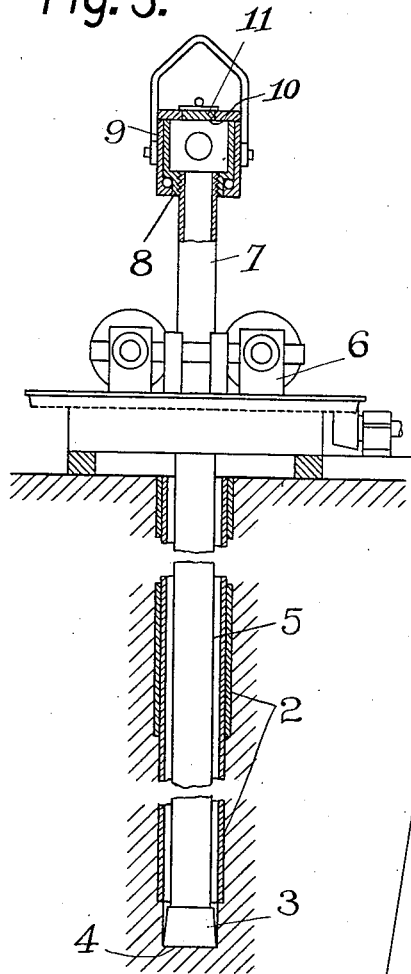
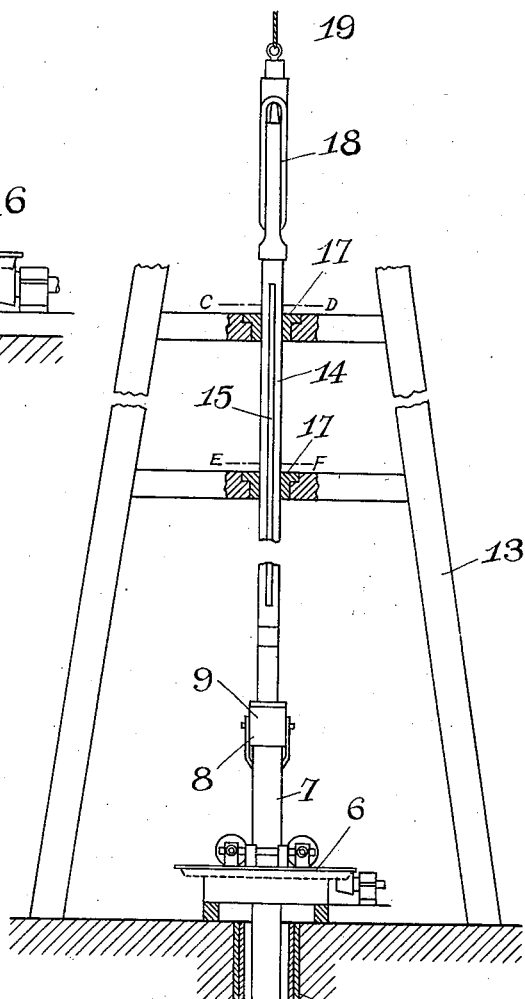
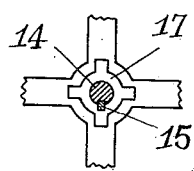
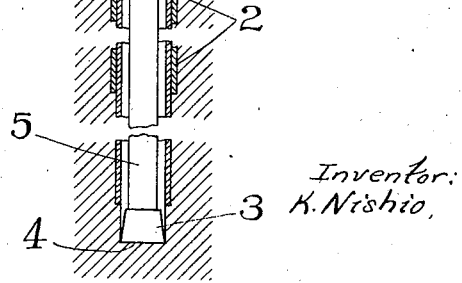
Inventor:
K. Nishio
By Glascock Downing & Seebold
Attys Patented Oct. 15, 1940

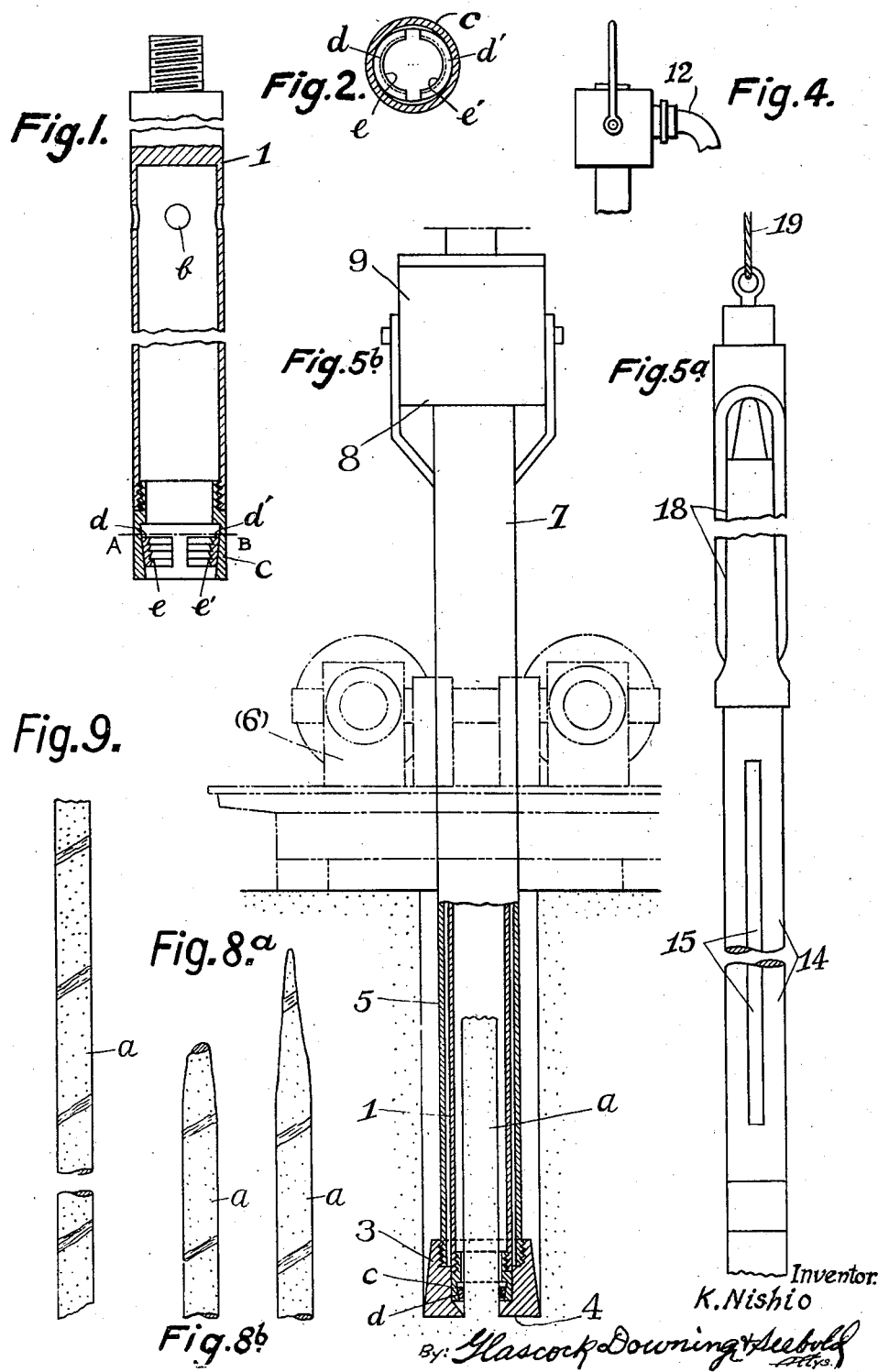

2,218,295

UNITED STATES PATENT OFFICE 2,218,295

APPARATUS FOR OBTAINING CORE FROM ROTARY CORE-BORING

Keijiro Nishio, Hongo-ku, Tokyo, Japan

Application November 7, 1938, Serial No. 239,345
In Japan November 11, 1937

3 Claims. (Cl. 255—72)

My invention relates to improvements in apparatus for obtaining boring core characterized in that in the course of operation of a rotary boring machine the boring core formed inside the rotary tubular bore cutter is picked up effectively in a short time and in a comparatively shorter length before the upper part of said core is worn by the friction of the inner side of the rotary bore cutter by means of a core remover which is introduced into the rotary bore cutter removing or without removing the swivel, and the core is removed from the rotary bore cutter by a wire rope line with or without a particular guide means which prevents rotation relative to the ground.

The object of the invention is to provide apparatus to obtain the boring core of a length from the top to the bottom corresponding to the penetrated depth of boring precisely in the state as it was in the ground by taking it out repeatedly every few hours in a comparatively short length, so that wearing off of the upper part of core is avoided and the nature of ground as well as the strata may be perfectly disclosed. Further objects of the invention will appear in the course of specification.

According to the present invention the rotary boring apparatus erected on the ground is provided at the top of its rotary bore cutter with a swivel for feeding circulating water to the bottom through the rotary bore cutter. A core remover is made to be introduced into the bore cutter to seize the boring core removing or without removing said swivel. The core remover is in operable connection with means for importing a shock or jar thereto, with or without a connecting rod arranged next to the shock imparting means. The connecting rod is guided in one direction by a key way. The connecting rod is connected to a wire rope which passes over a head pulley and is lead to the winding machine. In carrying out the invention a column or rock core is cut out from the rock forming the ground by the rotation of the bore cutter, prepared with a cutting crown or shoe at its lower end. Before the upper part of said core wears owing to the friction at the inner side of the rotary bore cutter by vibration, the boring machine is stopped and the core remover is introduced into the rotary bore cutter around the core to seize it at the lower end. The upper end of the core remover is connected to a connecting rod and shock imparting means, and the latter is connected to the wire rope of the winding machine. The core is broken at its lower end by giving a shock and is removed from the rotary bore cutter while at the same time means is provided to prevent rotation relative to the ground.

The invention is more fully explained with reference to the accompanying drawings in which Fig. 1 is a vertical sectional elevation of the core remover the upper end being shown in elevation.

Fig. 2 is a sectional plan view on the line A—B in Fig. 1.

Fig. 3 is an elevation of the rotary boring machine (the upper and lower parts being shown in section).

Fig. 4 is a side elevation of the swivel.

Fig. 5$^a$ is an elevational view of the upper half of the improved apparatus.

Fig. 5$^b$ is an elevational view of the lower part of the apparatus, the parts under ground being shown in section.

Fig. 6 is an elevational view partly in section showing the entire apparatus.

Fig. 7 is a sectional view taken on the line C—D and E—F of Fig. 6.

Figs. 8$^a$ and 8$^b$ show in elevation the upper parts of boring cores obtained according to the ordinary process.

Fig. 9 shows the upper and lower parts of the boring core obtained according to the present invention.

Similar reference characters designated corresponding parts throughout the drawings.

The core remover 1 comprises a hollow shaft adapted to be introduced into a rotary bore cutter 5 of a boring machine. The upper end of said shaft is screwed or otherwise properly constructed so as to be easily connected or disconnected to the part of the apparatus. The core remover 1 is provided at its side with openings b. The core remover is adapted to receive the boring core therein and its lower end c is conically tapered at inside, as shown in Fig. 1. A pair of arched jaws d d', conically tapered at the outside in accordance with the taper of the conical part c and having toothed surfaces e e' on the inside, is freely received inside the conical part c to seize the core when the core remover is raised.

A tower 13 is erected on the boring machine 6 and a wire-rope 19 is adapted to be connected through a head pulley to the winding machine (not shown). The rotary bore cutter 5 of the boring machine 6 is provided at its lower end with a shoe 3 conically tapered at the inside and outside as shown in Fig. 5, and a diamond crown or shoe 4 is fitted at its bottom. The bore cutter 5 is connected to the boring machine as usual and is driven by power whereby the bore cutter is rotated and the rock is cut in a column to form the boring core within the rotary bore cutter. A swivel 9 is fitted hermetically and rotatably at the top of the upper part 7 of the rotary bore cutter projecting out of the ground. Said swivel is provided at its top with an aperture closed by a cover 11 and at its side with a pipe 12 connected to a pump to supply water into the rotary drive pipe 5. The core remover 1 is made to be introduced into the rotary bore cutter 5 by opening the cover 11 without removing the swivel 9 from the pipe 7. Guides 17 are arranged on the tower 13 to pass a connecting rod 14 vertically therethrough. Said guides and the connecting rod are arranged with a key and key-way device, as shown in Figs. 6 and 7, so that the connecting rod is prevented from rotating relative to the ground while being raised. The lower end of the rod 14 is connected to the core remover 1 and its upper end to the shock imparting means 18. A casing pipe 2 (see Figs. 3 and 6) may be used as usual.

The rotary bore cutter 5 is rotated as usual and the core $a$ is cut out of the rock while water is circulated through the swivel 9. When the length of the core $a$ has reached about one foot or more the rotation of the pipe 5 and supply of circulating water is stopped. The cover 11 of the swivel 9 is opened and the core-catcher 1 which is connected through the rod 14 to the shock imparting means 18 is introduced into the upper part of the pipe 7. The core remover goes down through the rotary drive pipe 5 around the core $a$ and seizes at its lower end $c$ the lower part of the core $a$. A shock is given on the core remover 1 by the jarring members 18 and the core $a$ is broken at its lower end. Then the winding machine is started and the core remover 1 with the core $a$ is raised by the rope 19. The connecting rod 14 being guided by the guide 17 the core is raised vertically without rotation relative to the ground so that the core may be obtained in the case of sedimentary rocks to show their dip and strike. The boring core just obtained being comparatively shorter than usual its form is perfectly cylindrical up to its top as shown in Fig. 9 and has a precise length corresponding to the depth of boring.

The core may also be picked out by the core remover upon which wire rope and jars are connected but without the connecting rod. In this case the dip and strike of the strata from which core has been taken, cannot be measured.

The boring core obtained by the usual method almost always becomes conically tapered at its upper part, wearing off some portion (see Figs. 8ª and 8ᵇ). Such an imperfect and shortened core does not show the proper condition of the strata. This is why the rate of loss of the length of core is limited (ordinarily to be not less than 60%) in the specification of the boring practice in practice. In those hitherto used apparatus the swivel and other mechanical equipments need to be entirely removed for taking out the core. Such removal requires troublesome work and plenty of time. Therefore the cutting work of the rotary drive pipe is prolonged as long as possible until the diamond crown or cutting shoe can work no more. Consequently the core wears by the friction of the inner side of the bore cutter owing to the vibration of the core and its upper part wears conically or becomes broken until sometimes the length of the remaining core is reduced more than 50% or more of the depth bored.

According to the present invention the core-catcher is adapted to be repeatedly introduced into the rotary bore cutter, removing or without removing the swivel, the operation of taking out the core is rendered easy and simple, the core may be obtained before its upper part becomes worn or broken, so that a boring core perfect in length and form may be obtained.

Having now particularly described and ascertained the nature of my said invention and in what manner the same is to be performed I declare that what I claim is:

1. Apparatus for obtaining boring core comprising in combination a rotary tubular bore cutter, a swivel carried at the upper end of the bore cutter and provided with means for introducing circulating fluid and having an opening in its top, a removable cover for the opening, a cylindrical core remover adapted to be inserted through the opening in the top of the swivel and to be freely arranged within the bore cutter and about the bore, a pair of opposed jaws at the lower end of the core remover for engaging the lowermost end of the core, means for imparting a shock to the core remover to break the core at the bottom, and means for raising the core remover and for preventing rotation thereof.

2. Apparatus as claimed in claim 1, in which a tower is arranged above the cutter, said tower including uprights and cross pieces, guides in the cross pieces, a connecting rod connected to the upper part of the core remover and provided with a longitudinal key engaged in the guideways which prevent rotation of the remover while being raised and the shock imparting means, and the lifting means being connected with the top of the connecting rod.

3. Apparatus as claimed in claim 1, in which the core remover is provided at its bottom with a compartment, the walls of which are tapered downwardly and towards each other for slidably receiving the jaws, said jaws being arched for sliding movement on the tapered surfaces and provided with teeth on their inner faces, and the core remover being also provided with openings to admit the circulating fluid.

KEIJIRO NISHIO.